Sept. 25, 1923.　　　　　　　　　　　　　　　　　1,468,868
　　　　　　G. REICHSTETTER, JR., ET AL
　　　　　　　SPRING BUMPER FOR VEHICLES
　　　　　　　　　Filed May 24, 1923
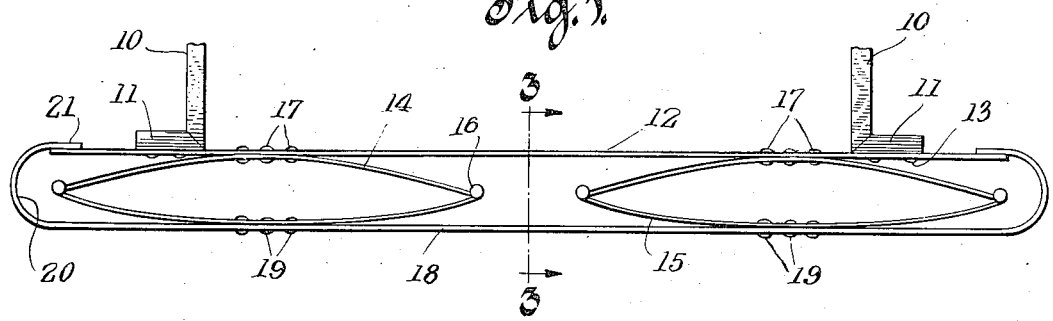
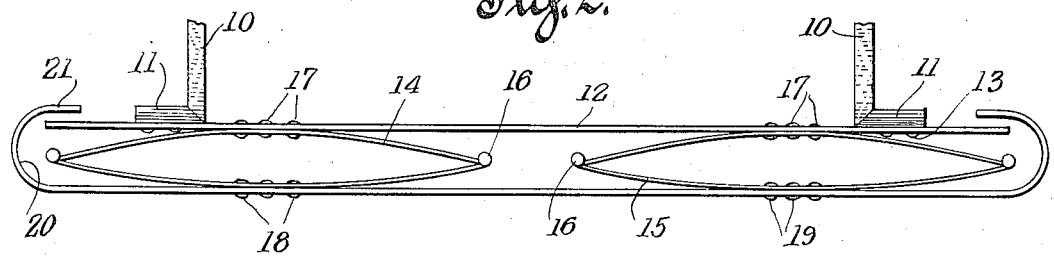
INVENTORS
George Reichstetter, Jr.
Otto E. Reichardt
BY
Fredk. C. Fischer
ATTORNEY Patented Sept. 25, 1923.

1,468,868

UNITED STATES PATENT OFFICE.

GEORGE REICHSTETTER, JR., OF NEWARK, AND OTTO E. REICHARDT, OF IRVINGTON, NEW JERSEY.

SPRING BUMPER FOR VEHICLES.

Application filed May 24, 1923. Serial No. 641,033.

*To all whom it may concern:*

Be it known that we, GEORGE REICHSTETTER, Jr., and OTTO E. REICHARDT, both citizens of the United States, and residents, respectively, of Newark and Irvington, both in the county of Essex and State of New Jersey, have invented certain new and useful Improvements in Spring Bumpers for Vehicles, of which the following is a specification.

The invention relates to that class of devices carried at the front or rear or both ends of vehicles, particularly of the self propelled type, whereby, in case of a collision, the blow, shock or jar is cushioned in its transmission with respect to its effect upon the object struck and the vehicle thus provided, thereby minimizing the consequences which would otherwise occur.

One of the objects of this invention is to provide a bumper of an essentially simple nature, composed of only two principal parts disposed in a horizontal plane and having therebetween efficient spring elements, the device being symmetrically proportioned, presenting an attractive appearance unlike the cumbersome appendages commonly employed.

A further purpose is to produce a bumper in which the springs are maintained at all times under moderate compression, these springs acting as connections between the main elements.

Another aim is in the provision of a bumper that can be manufactured at a moderate cost and is easily applied to any type of vehicle of the class mentioned.

These and like objects are accomplished by the simple and novel construction and arrangement of parts hereafter described and illustrated in the accompanying drawing forming part thereof, and in which:—

Figure 1 is a plan view of a bumper made in accordance with the invention, in its normal or extended position.

Figure 2 is a similar view of the same but shown as under compression during impact.

Figure 3 is a transverse sectional view taken on line 3—3 of Fig. 1.

In making attachment to the vehicle a pair of supports 10 are firmly secured to the chassis or frame, the same extending at opposite sides to points slightly in advance of the wheels or other parts of the vehicle, these supports being turned oppositely outward to form brackets 11 disposed in the same level horizontal plane.

The inner bar 12 of the bumper is merely a straight piece of flat rectangular material of suitable thickness and width, and of such length that the ends extend outwardly to a distance equivalent to any projections at the sides of the vehicle body, the bar being secured to the bent ends 11 of the support by any preferred means, as the rivets 13.

A pair of springs composed of semi-elliptic or bowed members 14 and 15, connected at their extremities by pins 16 which the spring ends encircle, are secured to the bar 12 by fastening 17 passing through the spring elements 14.

The outer or contact bar 18 is similarly secured to the spring elements 15 by rivets 19, this bar being spaced parallel and directly in front of the bar 12, its ends however being bent to form semi-circular curves 20 terminating in short flat extensions 21 adapted to engage over the ends of the bar 12 in such manner as to hold the springs in compression at all times.

From the foregoing it will be seen that upon the application of sufficient pressure to the bar 18 to overcome the springs, that the latter will recede and the clips or bar extensions 21 will move away from the ends of the bar 12 but act to avoid excessive rebound of the springs when the pressure is released.

It will also be seen that the springs are enclosed except at their upper and lower edges and that a light and efficient structure of extreme simplicity and great flexibility has been presented.

Although the foregoing is descriptive of the preferred embodiment of the invention, it will be apparent that minor changes may be made in its construction, without the exercise of invention or conflicting with the scope of the claims hereto appended.

Having thus described our invention, what we claim as new and desire to secure by Letters Patent, is:—

1. A vehicle bumper comprising a pair of bars relatively front and rear disposed in spaced relation, said rear bar being attached to the vehicle, pairs of bowed springs supportingly secured between said bars, and clips formed on the front bar engaging the ends of said rear bar whereby said springs are held in compression.

2. A vehicle bumper comprising a plain straight horizontal bar rigidly secured to the frame of the vehicle to extend beyond the sides thereof, a second bar having semi-circularly curved ends disposed over the ends of the first bar, and pairs of semi-elliptic springs disposed between said bars, said springs being secured midway in their lengths to the respective bars.

3. A vehicle bumper comprising a plain straight horizontal bar rigidly secured to the frame of the vehicle to extend beyond the sides thereof, pairs of springs composed of semi-elliptic members joined at their ends one member of each pair being fixed to the outer face of said bar, a second bar fixed to the other members of said springs and supported thereby, and means on the ends of said second bar encompassing the outer ends of said springs and the first named bar whereby said springs are held in compression and limited in their rebound.

4. A bumper comprising a pair of bars respectively inner and outer, contractible means disposed between said bars, and means on the ends of one of said bars to limit the distance between said bars.

This specification signed and witnessed this 5th day of May, 1923.

GEORGE REICHSTETTER, Jr.
OTTO E. REICHARDT.

Witnesses:
FREDK. C. FISCHER,
WM. F. ROGGE.